United States Patent
Croft (10) Patent No.: US 8,805,758 B2
(45) Date of Patent: Aug. 12, 2014

(54) METHOD OF AUTOMATICALLY MODIFYING THE PROBABILITY OF RANDOM SELECTION OF A PRESENTATION BASED ON HOW LONG THE USER DELAYS BEFORE SKIPPING (TIME-BASED SKIP WEIGHTING)

(76) Inventor: David Wallace Croft, Dallas, TX (US)

( * ) Notice: Subject to any disclaimer, the term of this patent is extended or adjusted under 35 U.S.C. 154(b) by 239 days.

(21) Appl. No.: 13/317,970

(22) Filed: Nov. 1, 2011

(65) Prior Publication Data

US 2012/0123982 A1  May 17, 2012

Related U.S. Application Data

(60) Provisional application No. 61/456,524, filed on Nov. 9, 2010.

(51) Int. Cl.
*G06F 15/18* (2006.01)
*G11B 27/32* (2006.01)
*G11B 27/10* (2006.01)

(52) U.S. Cl.
CPC ............ *G11B 27/105* (2013.01); *G11B 27/322* (2013.01)
USPC .......................................................... 706/14

(58) Field of Classification Search
USPC .......................................................... 706/14
See application file for complete search history.

(56) References Cited

U.S. PATENT DOCUMENTS

| | | | |
|---|---|---|---|
| 5,051,973 A | 9/1991 | Shiba et al. | |
| 6,121,533 A | 9/2000 | Kay | |
| 6,355,872 B2 | 3/2002 | Park et al. | |
| 6,904,004 B1 | 6/2005 | Van der Meulen | |
| 7,227,073 B2 | 6/2007 | Kim | |
| 7,228,054 B2 | 6/2007 | Cowgill | |
| 7,489,979 B2 | 2/2009 | Rosenberg | |
| 2002/0103796 A1 | 8/2002 | Hartley | |
| 2004/0131333 A1 | 7/2004 | Fung et al. | |
| 2005/0098023 A1 | 5/2005 | Toivonen et al. | |
| 2007/0025194 A1 | 2/2007 | Morse | |
| 2007/0089062 A1* | 4/2007 | Song | 715/731 |
| 2007/0100481 A1 | 5/2007 | Toms et al. | |
| 2008/0072740 A1 | 3/2008 | Horii | |
| 2009/0282020 A1 | 11/2009 | McSheffrey | |
| 2010/0332440 A1* | 12/2010 | Brodsky | 706/52 |
| 2011/0125712 A1 | 5/2011 | Kaila | |

OTHER PUBLICATIONS

Mattias Jacobsson, Mattias Rost, Lars Erik Holmquist; When Media Gets Wise:Collaborative Filtering with Mobile Media Agents; IUI'06; Jan. 29-Feb. 1, 2006; ACM 1-59593-287-9/06/0001; Sydney, Australia.

Maria Hakansson, Mattias Jacobsson, Lars Erik Holmquist; Designing a Mobile Music Sharing System Based on Emergent Properties; http://www.sics.se/fal/publications/2005/AMT05_hakansson_short.pdf; Future Applications Lab, Viktoria Institute, Sweden.

(Continued)

*Primary Examiner* — Kakali Chaki
*Assistant Examiner* — Ababacar Seck
(74) *Attorney, Agent, or Firm* — John Lindsay; W. Dean Cook (57) ABSTRACT

A method of adjusting the probability of a presentation being randomly selected during random play based on user feedback where the length of delay prior to the user pressing the skip button causes a modification in the probability of that presentation being displayed again.

14 Claims, 11 Drawing Sheets

(56) References Cited

OTHER PUBLICATIONS

Nichols, D.M. (1998) Implicit rating and filtering; Proceedings of the Fifth DELOS Workshop on Filtering and Collaborative Filtering; Budapest, Hungary: ERCIM. 31-36.

Kaji, Katsuhiko; Hirata, Keiji; Nagao, Katashi. A Music Recommendation System Based on Annotations about Listeners' Preferences and Situations. Automated Production of Cross Media Content for Multi-Channel Distribution, 2005. AXMEDIS 2005. Nov.-Dec. 2005. pp. 3. doi: 10.1109/AXMEDIS.2005.3 (IEEE Xplore).

* cited by examiner

METHOD OF AUTOMATICALLY MODIFYING THE PROBABILITY OF RANDOM SELECTION OF A PRESENTATION BASED ON HOW LONG THE USER DELAYS BEFORE SKIPPING (TIME-BASED SKIP WEIGHTING)

CROSS-REFERENCE TO RELATED APPLICATIONS

This application claims the benefit of provisional patent application Ser. No. 61/456,524, filed Nov. 9, 2010 by the present inventor.

FEDERALLY SPONSORED RESEARCH

Not Applicable

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

SEQUENCE LISTING OR PROGRAM

The present application includes a Computer Program Listing filed on a single compact disc (CD), filed in duplicate. The Computer Program Listing is presented in a single file on each CD and is named skipper-code-2010-09-19.zip. It is written in Java. The Computer Program Listing was created on Sep. 19, 2010 and comprises 115 kilobytes.

BACKGROUND

1. Field

This application relates to adjusting the probability that a particular presentation, including a media file, in a presentation set will be randomly selected for presentation on an electronic device based on user behavior.

2. Prior Art

Many electronic products designed to present media files have a mode of presenting the media files in a random order. For instance, on an MP3 player, there is normally a "random play mode" (or "shuffle mode") that will play all media files in a pseudo-random order that is selected by means of various well-known computer programs and methods. This random order is likely to be other than the order that appears on the device's play list, when it is played in non-random order. For instance, the device could contain three songs: A, B, and C. In "non-random mode", the device plays in the order of A first, B second, and C third. This order was either directly selected by the user, or indirectly selected by the user. It can be "indirectly selected by the user" because, for instance, this ordering is related to the chronological order that the songs were added to the device (A was placed on the device first, B second, and C first—following the "FIFO" principle of play). Regardless of how the order of play (A first, B second, and C third) was initially selected, that is the order that the device always plays the songs in when it is in non-random mode, unless and until the user manually changes the order. By way of contrast, in random play mode, the device, using various techniques that are well-known in the art of computer science, may play B first, then C, then B again, and then A. Not only does the device play songs "randomly" in random play mode, but it also may play the song more than once, before it has played other songs on the list—just as a matter of chance. It should also be noted here that "random play mode" does not mean that a new list of media files is being randomly created in a new order, and then displayed in that new order. "Random play mode", as used here, simply means that the device is randomly selecting a media file from the set list of media files, and then playing that media file. A new list of media files is not being created. For instance, the MP3 player that contains 3 songs: A, B, and C, is not creating a new, randomized list of songs when it is in random play mode, it is simply randomly selecting a song, either A, B, or C, from the list of available songs and then playing it for the user. The original order of songs, A, B, and C, remains intact, and no new list of songs is created.

A variation, also disclosed in the prior art, on the above-described "random play mode" is for the device to adjust the probability of individual media files being presented by noting and responding to user behavior in response to a particular presentation. This allows the user to influence the probability that particular media files will be played, in accordance with their preferences, while still maintaining an element of randomness regarding what is played. Most users of devices such as MP3 players normally have preferences regarding what types of songs on their play list they would like to hear, or not hear, and these preferences can change over time. This variation on the above-described "random play mode" allows the user to reduce the probability that a particular song would play on their MP3 player by skipping past a particular song. This is described here as "skip-weighting". ("Skipping" is typically accomplished on an MP3 player by pressing a button that orders the device to play another song. On a computer randomly displaying images on a computer screen "skipping" can be accomplished by allowing the user to press a button on the keyboard, such as the space bar, which causes the computer to discontinue displaying the current image and to display a new image.) The more the user "skips" past a particular song, the more the probability of the song being played in the future would be reduced. This variation on random play mode would also allow a user to increase the probability that a particular song on an MP3 player would be heard by skipping past other songs on the play list more often than a particular song, thereby increasing its relative probability of being randomly selected by the MP3 player in the future.

A problem with skip weighting in the prior art is that it does not take into account when the user skips past a particular media file. The amount of time a user takes before skipping past a media file currently displayed would typically correlate with whether the user found the media file of interest or not. For instance, if the user skips a visual media file (called "File A") after 15 seconds of display, and skips another media file (called "File B") after 2 seconds of display, then, other things equal, the 13 second difference would indicate that the user is more interested in File A than in File B.

SUMMARY

In accordance with one embodiment, this invention discloses a method to modify the selection probability for a presentation that was randomly selected from a presentation set, by modifying the selection probability of said presentation based on the skipped presentation duration or presentation fraction.

DETAILED DESCRIPTION

The following terms have the following definitions:

Skipping: Discontinuing the current presentation, and starting a new presentation. "Skipping" is typically accomplished on an MP3 player by pressing a button that orders the device to play another song. On a computer randomly displaying images on a computer screen "skipping" can be accomplished by allowing the user to press a button on the keyboard, such as the space bar, which causes the computer to discontinue displaying the current image and to display a new image. Media File: A media file would include files for showing pictures in jpeg, gif, or some other format. It would also include audio files such as mp3, way, or some other format. It would further include files that show video or animation. Presentation: Anything presented to a user who has the option of discontinuing the presentation by skipping. This would typically be a media file displayed on any type of computer output device. However, it can also be something other than a media file, such as a device that releases a particular scent into a room. The device continues to release the scent until it is "skipped" by the user, at which point a new scent is released into the room. (The enclosed invention could be used to create a device that adjusts the probability of a particular scent from a plurality of scents being released by such a device, based on the length of time before a user "skips" that scent.) Additionally, a "presentation" could be something like a set of radio stations or a set of live video channels in which the user can skip to another station or channel with weighted random selection. Selection Probability: The probability that a particular presentation from a given presentation set will be randomly selected for display. Presentation Set: A group of one or more presentations, typically media files, that can be selected for display. Random Play: A mode on any electronic product, or device, such as a computer, that will display a media file by being randomly selected by the electronic device. This random selection by an electronic device will typically result in media files being displayed in an order other than the sequential order in which the particular media files may have been ordered to be played by the user. Skipped Presentation Duration: This is the length of time between the time a presentation starts and the time the presentation is skipped by the user; however, the basis for the skipped presentation duration can be indirect, such as using the percentage of a presentation presented before skipping—which is still indirectly based on the length of time. Unskipped Presentation Duration: If not skipped, this is the duration of a presentation before another random selection of a presentation. For instance, an audio file might play for two and a half minutes, until completion of the audio file—this is the unskipped presentation duration. However, there are presentations that could have no unskipped presentation duration such as an audio file on repeat that is played continuously until it is skipped. The invention described here can be used with presentations that have an unskipped presentation duration and also for presentations that have no unskipped presentation duration. The source code is an embodiment of the invention that allows the user to configure the unskipped presentation duration to an arbitrary length of time, such as setting the display times to 10 seconds each. Presentation Fraction: Is calculated as the skipped presentation duration divided by the unskipped presentation duration, which ranges from zero to one. Normalizing the selection probabilities: Means modifying the probabilities such that the total sum of the probabilities in the set equals 1.0 (i.e., 100%). There are several ways to do this. Scaling Factor: Is the new probability divided by the old probability before "normalization", i.e., normalizing the selection probabilities. For example, if the scaling factor is 0.5, the new probability will be half the old probability. (By "probability" in calculating the scaling factor, what is meant is the selection probability of the skipped presentation.)

As previously mentioned, a problem with prior art skip-weighting is that it does not take into account when the user skips past a particular media file. The amount of time a user takes before skipping past a media file currently displayed would typically correlate with whether the user found the media file of interest or not. The invention disclosed here solves this problem with a method of adjusting the probability of a media file being randomly selected during "random play" based on user feedback, where the length of delay prior to the user pressing the skip button causes a modification in the probability of that media file being displayed again. The flowcharts and code included in this provisional patent application disclose this time-based skip-weighting invention.

Source code for one way of implementing the invention is included. This source code is written in the computer programming language Java. The source code is written for displaying a plurality of visual image files on a computer screen in accordance with the invention disclosed, but it could easily be modified to work with audio or video files that are sent to an audio/video output device. Modifying it to work with audio or video files would be trivially simple to anyone skilled in the art. This method could also be easily implemented using electronic circuits, instead of software, by means of the flowcharts included in this provisional patent application.

Figure 1:
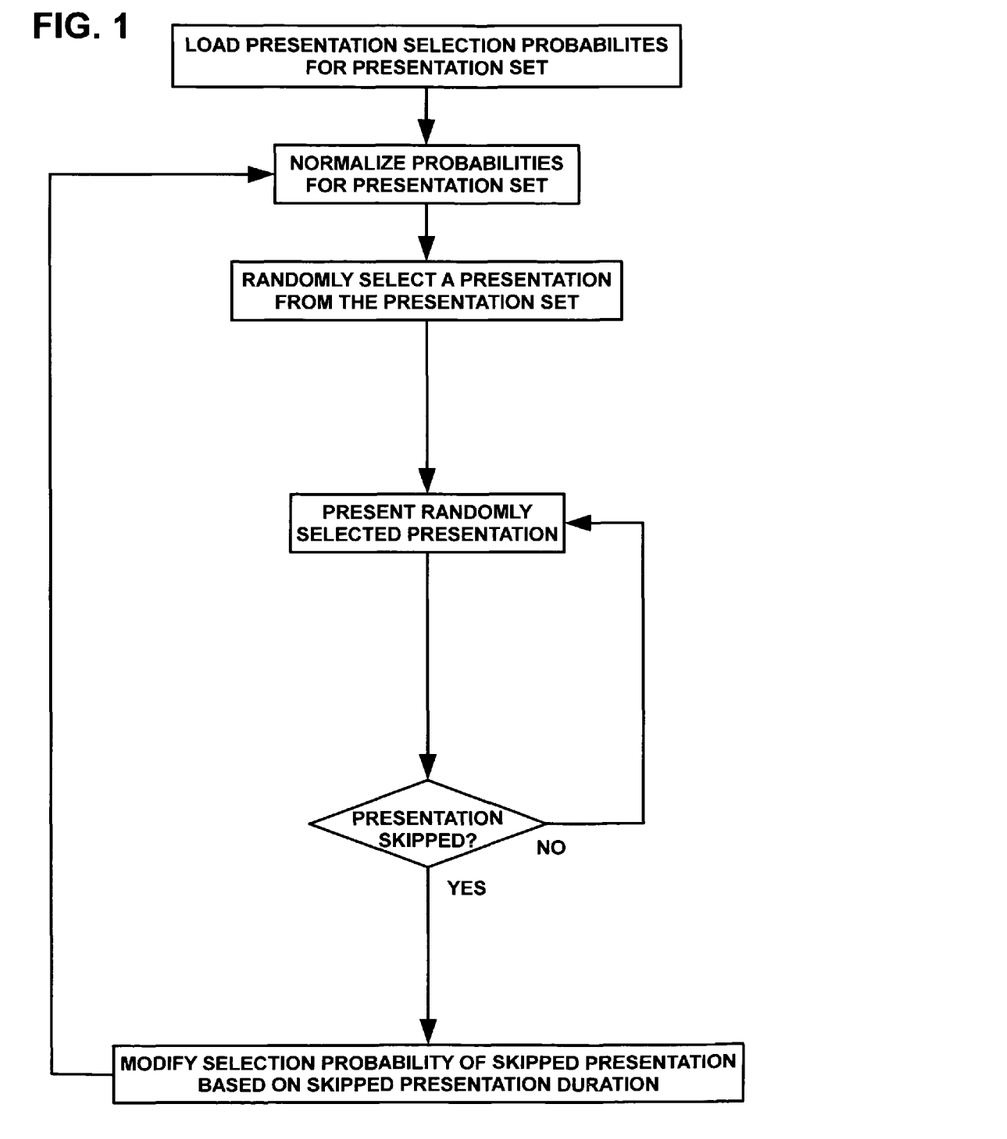
FIG. 1: Discloses a method for presenting a presentation, such a media file, from a presentation set for an indefinite period of time.

FIG. 1 discloses a method for presenting a presentation, such a media file, from a presentation set for an indefinite period of time. The presentation continues until such time as it is skipped by the user, at which point the final step of modifying the selection probability of the skipped presentation based on skipped presentation duration occurs. Until the presentation is skipped by the user, it will continue to display indefinitely.

Figure 2:
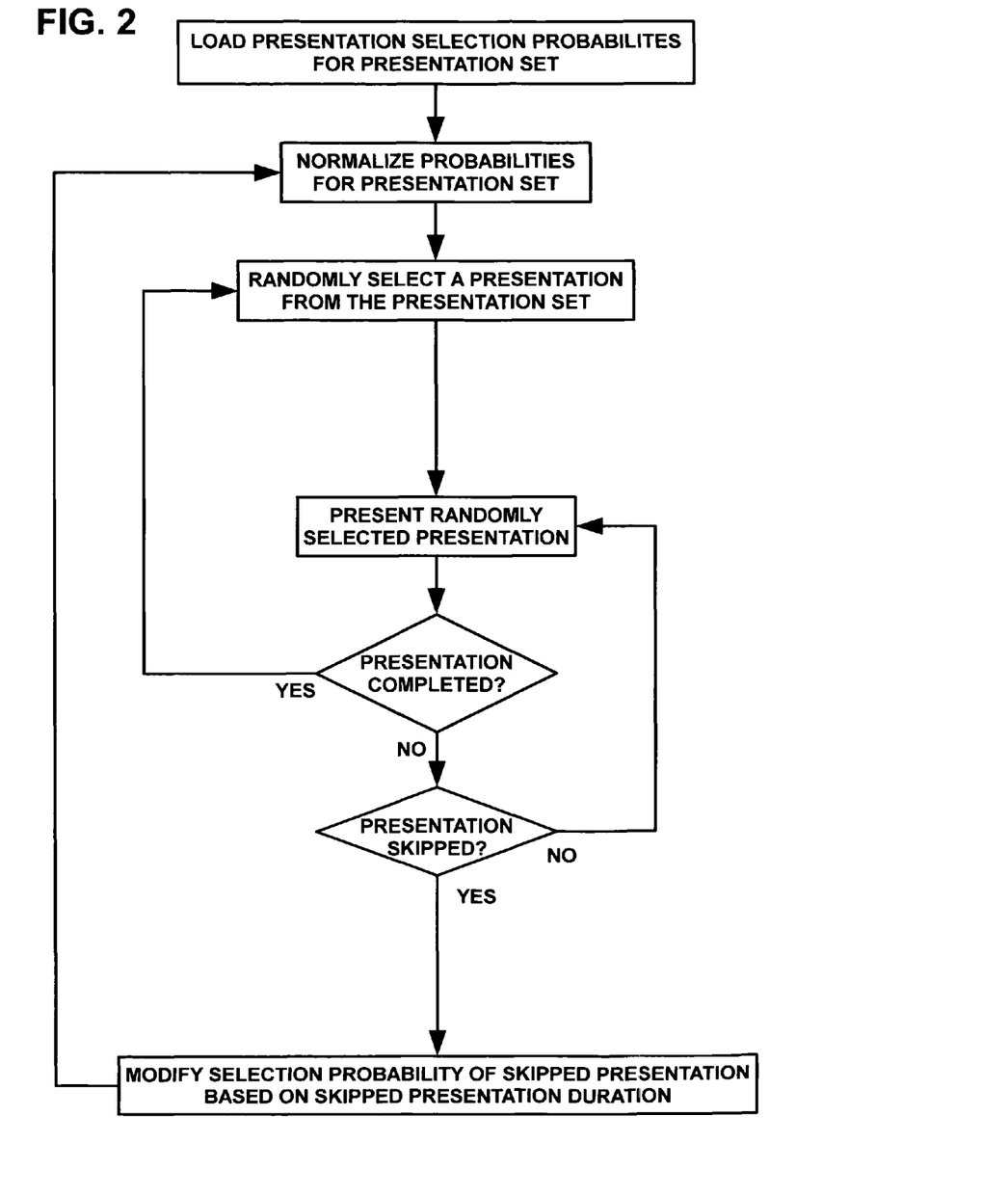
FIG. 2: This discloses an additional step to FIG. 1, which checks to see if a presentation has been completed.

FIG. 2, unlike FIG. 1, discloses an additional step called "Presentation completed?" which checks to see if a presentation has been completed. This would mean that the presentation could end, regardless of whether the user skips the file.

Figure 3:
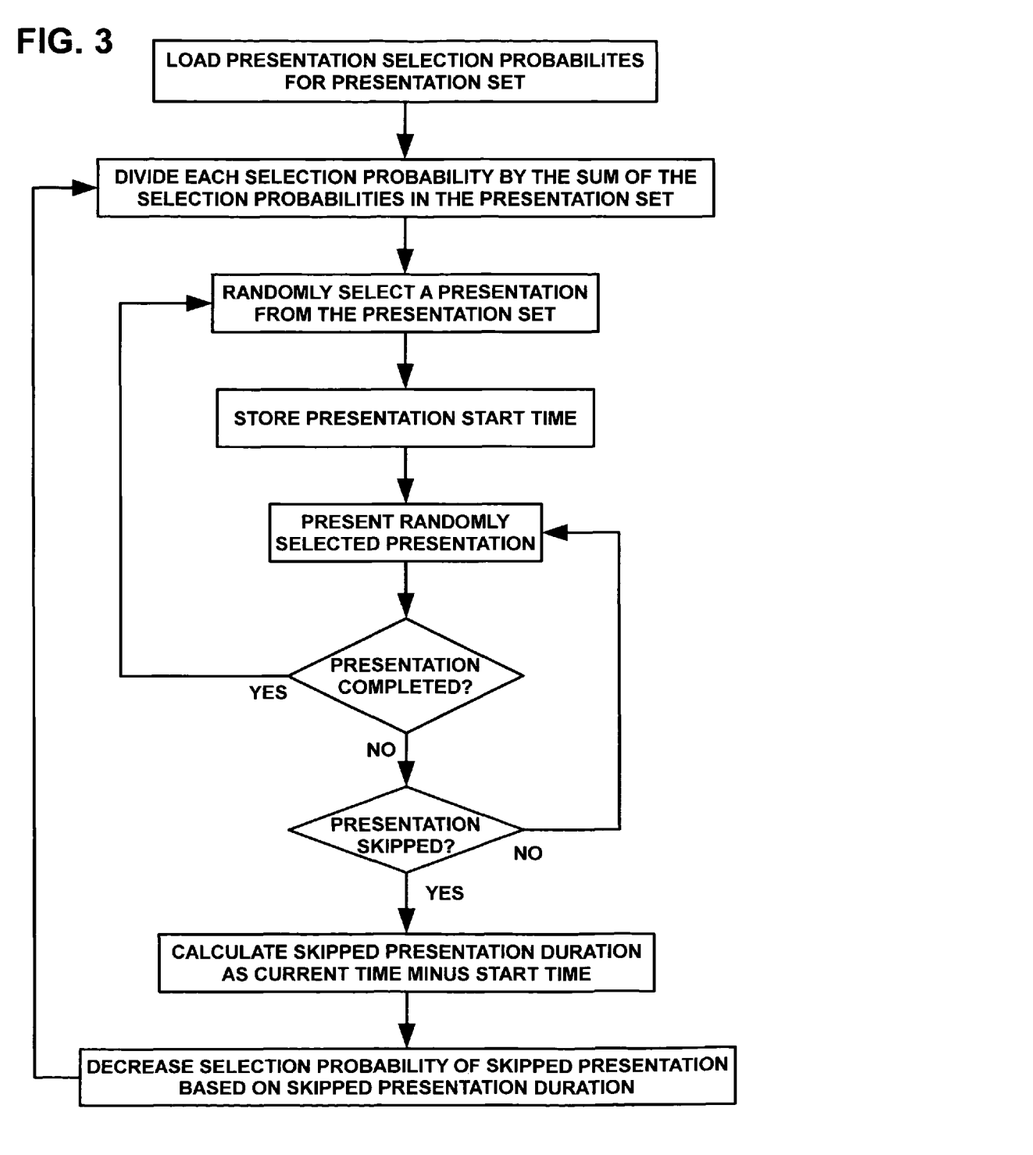
FIG. 3: This shows how the invention is implemented in the included source code.

FIG. 3 shows how the invention is implemented in the source code that is included herein.

Figure 4:
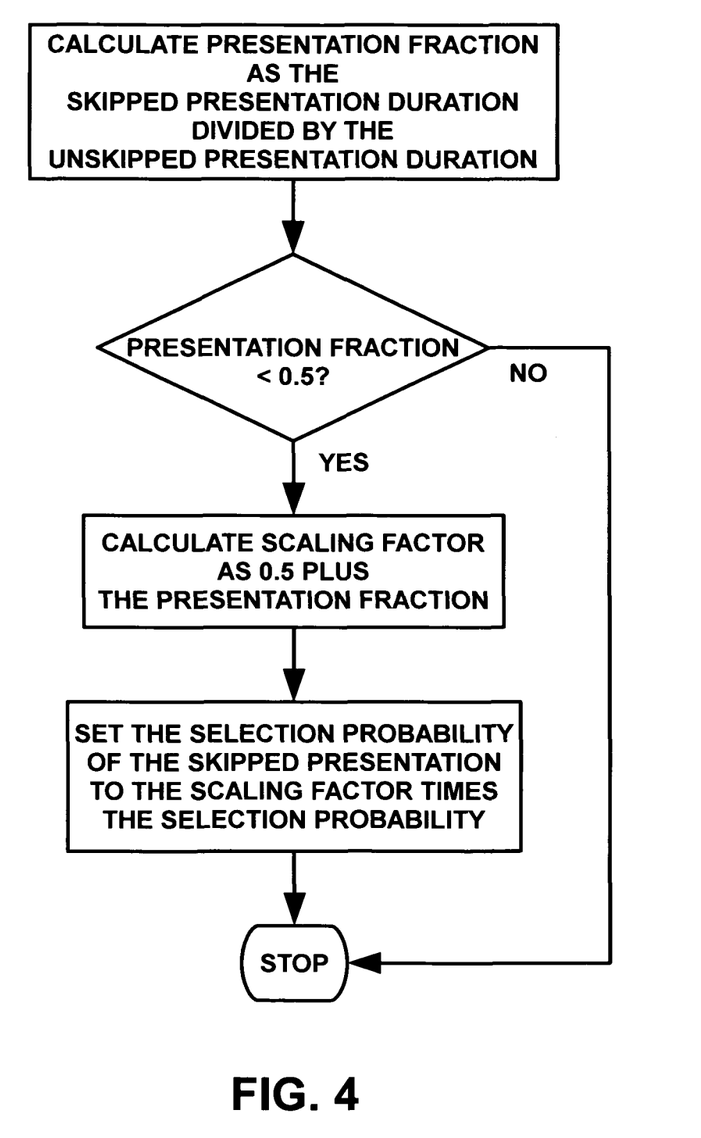
FIG. 4: This is a sub-flowchart of the last step from FIG. 3, "Decrease selection probability of skipped presentation based on skipped presentation duration".

FIG. 4 shows a sub-flowchart of the last step from FIG. 3, "Decrease selection probability of skipped presentation based on skipped presentation duration". This is an embodiment of the invention of time-based skip-weighting. The last step in this figure is described as "stop". This indicates that the flow of the program continues in FIG. 3 at "Divide each selection probability by the sum of the selection probabilities in the presentation set" when "Stop" is reached.

A series of graphs, FIGS. 5-11, have been included here that demonstrate some of the possible relationships between the Scaling Factor and the Skipped Presentation Duration or the Presentation Fraction that can be implemented in the invention. Each of these relationships are drawn on a Cartesian coordinate system, with Skipped Presentation Duration or Presentation Fraction as the independent variable, and Scaling Factor as the dependent variable. Graphs one through three use skipped presentation duration directly. Graphs four through seven use Presentation Fraction on the x-axis, however, presentation fraction is merely the percentage of a presentation presented before skipping—which is still indirectly based on the length of time.

Figure 5:
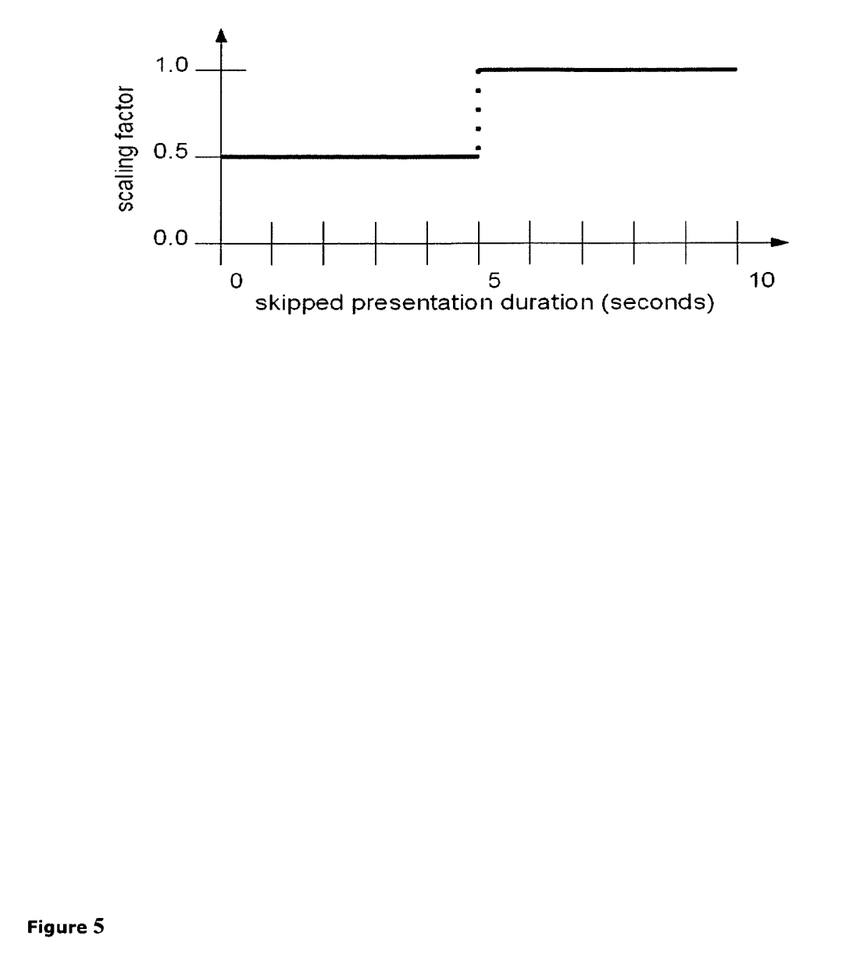
FIG. 5: This is the first graph.

FIG. 5 is the first graph below in the figures. If the user skips the presentation within the first 5 seconds of the presentation, then the scaling factor is 0.5. After 5 seconds, the scaling factor is 1.0, which means that there is no "penalty" imposed on the presentation after 5 seconds. In other words, the selection probability of the presentation remains the same going into the future.

Figure 6:
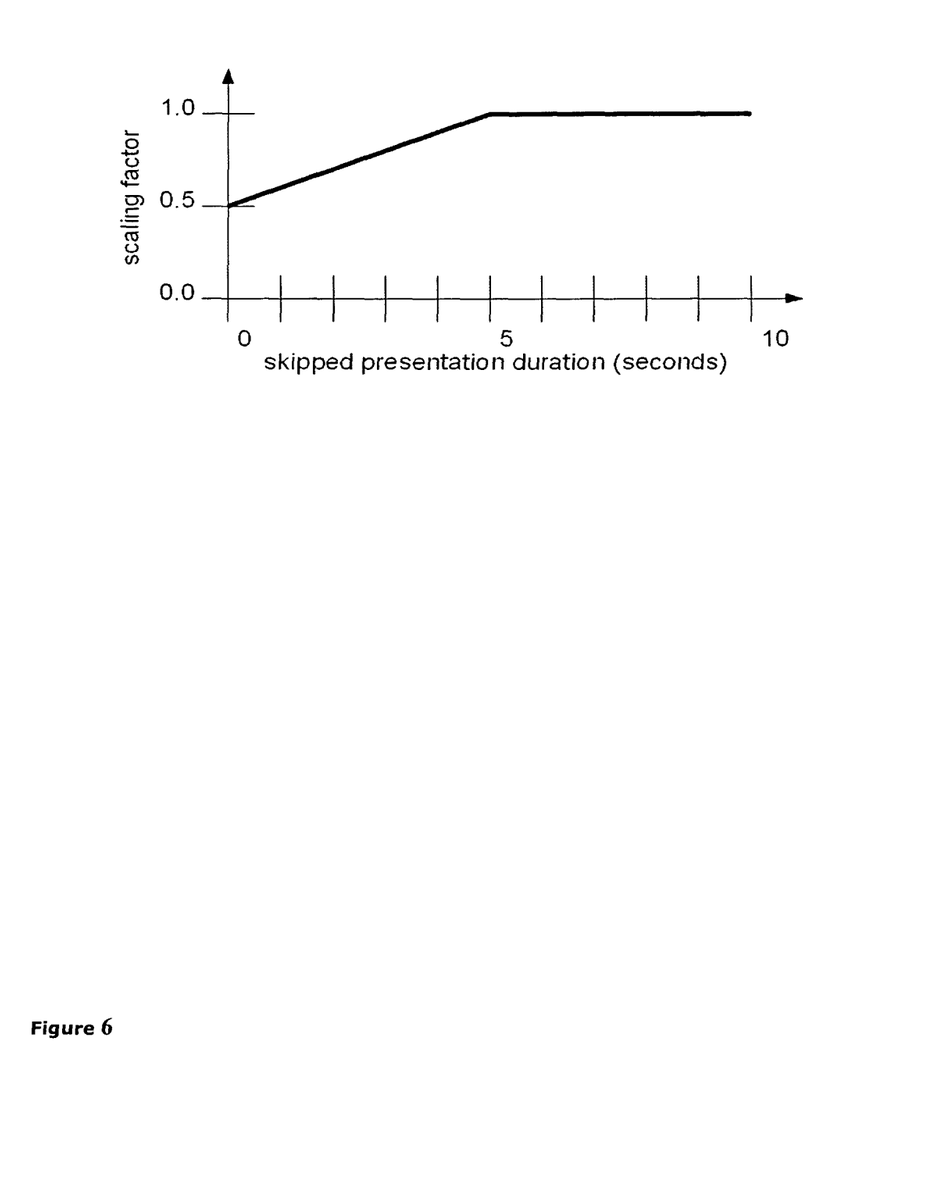
FIG. 6: This is the second graph.

FIG. 6 is similar to the graph in FIG. 5 in that the scaling factor is some number less than one if the user skips the presentation within the first 5 seconds of the presentation. FIG. 6 is different from FIG. 5 in that the scaling factor varies in a continuous linear relationship. As the presentation duration increases, the scaling factor increases linearly until the presentation duration reaches 5 seconds, at which point the scaling factor is 1.0, and there is no further increase in scaling factor as time passes.

Figure 7:
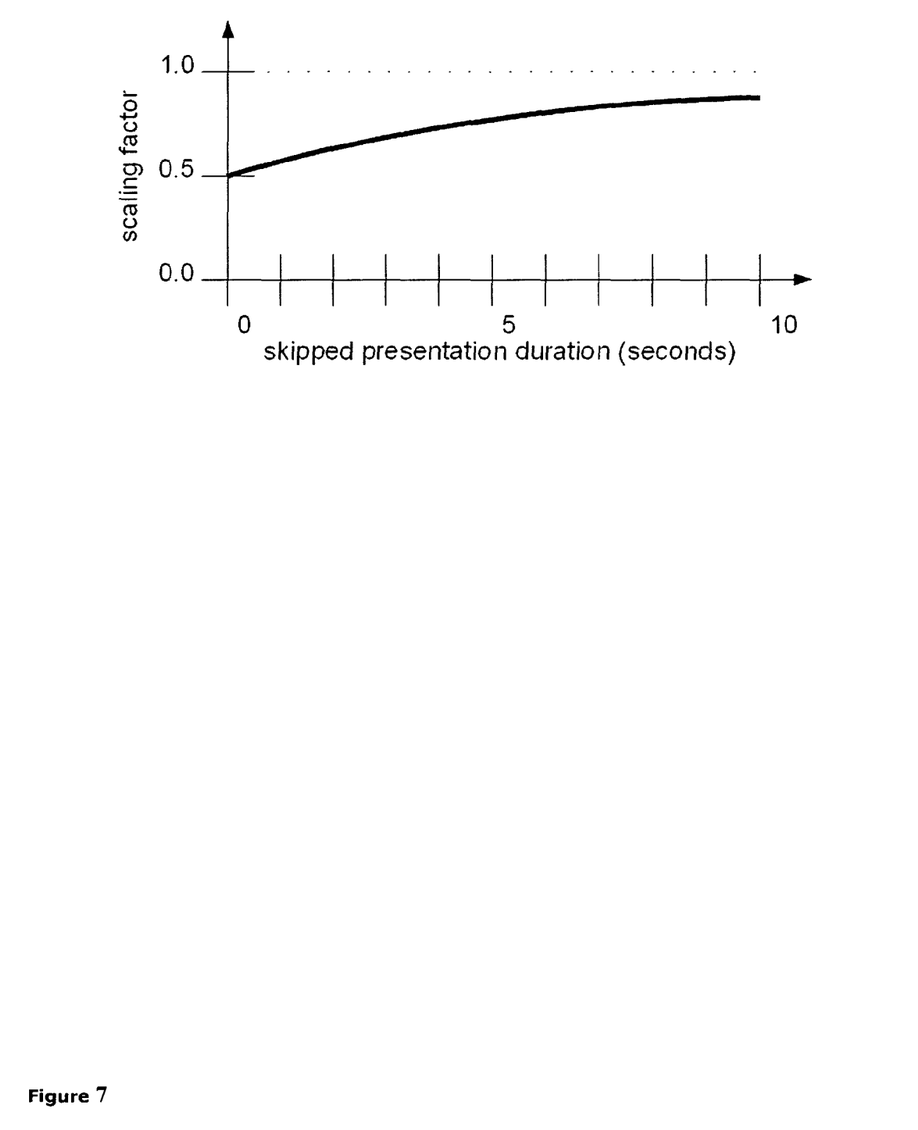
FIG. 7: This is the third graph.

FIG. 7 is an example of a non-linear increase in scaling factor in which the scaling factor approaches 1.0, but never actually reaches 1.0.

Figure 8:
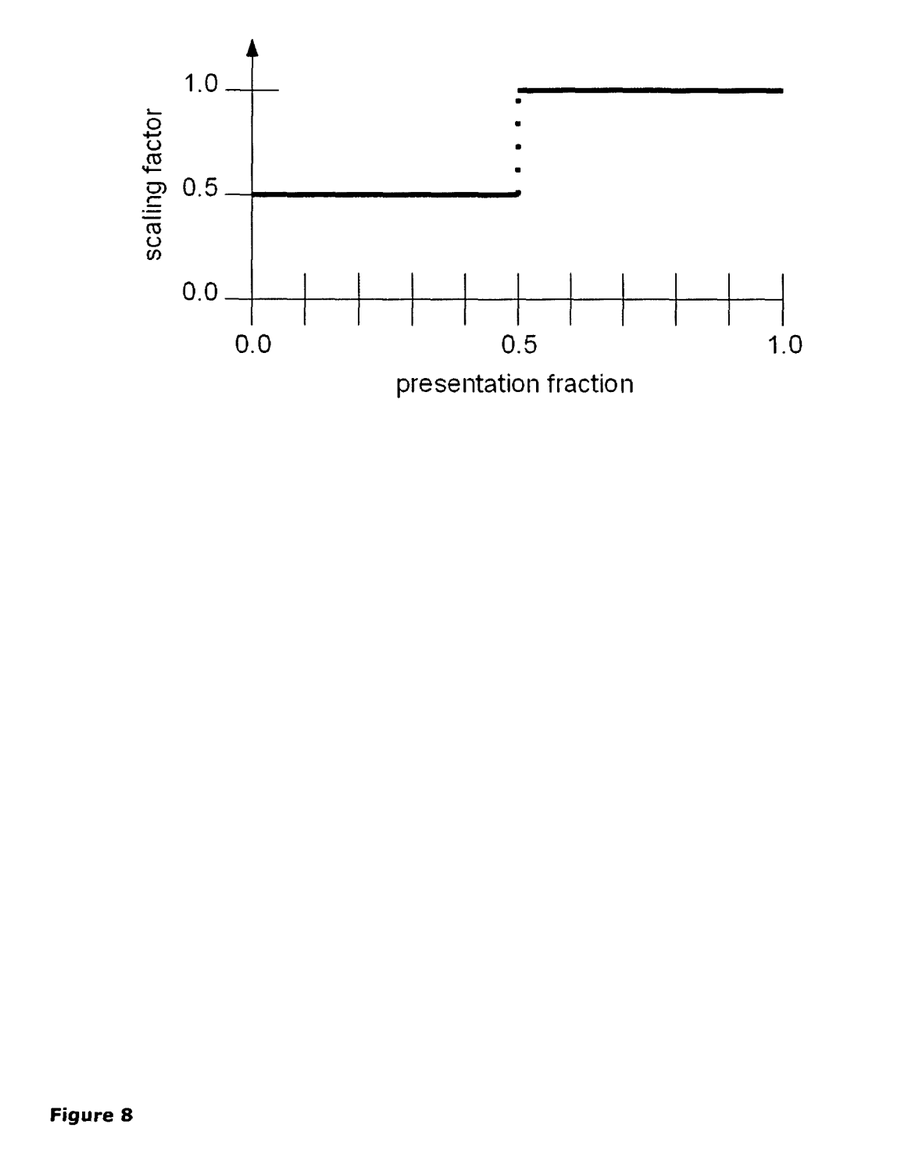
FIG. 8: This is the fourth graph.

FIG. 8 is similar to FIG. 5, but instead of the horizontal axis representing skipped presentation duration, which is a direct measurement of time elapsed, it represents the Presentation Fraction, which, as already mentioned, is still indirectly based on the length of time. (It might be easier to understand the Presentation Fraction as equivalent to a percentage of the presentation, which the presentation fraction would be if multiplied by 100.)

Figure 9:
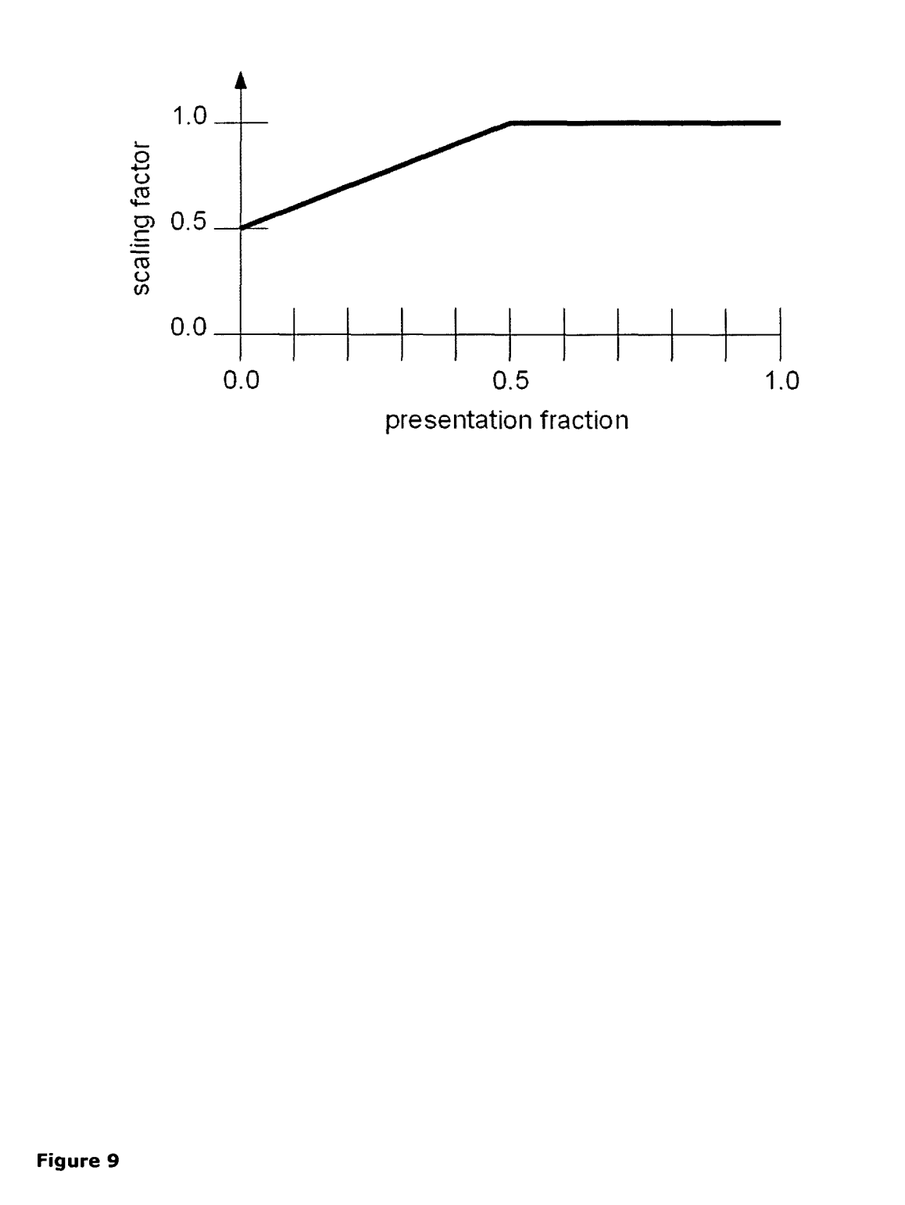
FIG. 9: This is the fifth graph.

In FIG. 9, the scaling factor varies linearly until the Presentation Fraction reaches 0.5, at which point the maximum scaling factor of 1.0 is reached.

Figure 10:
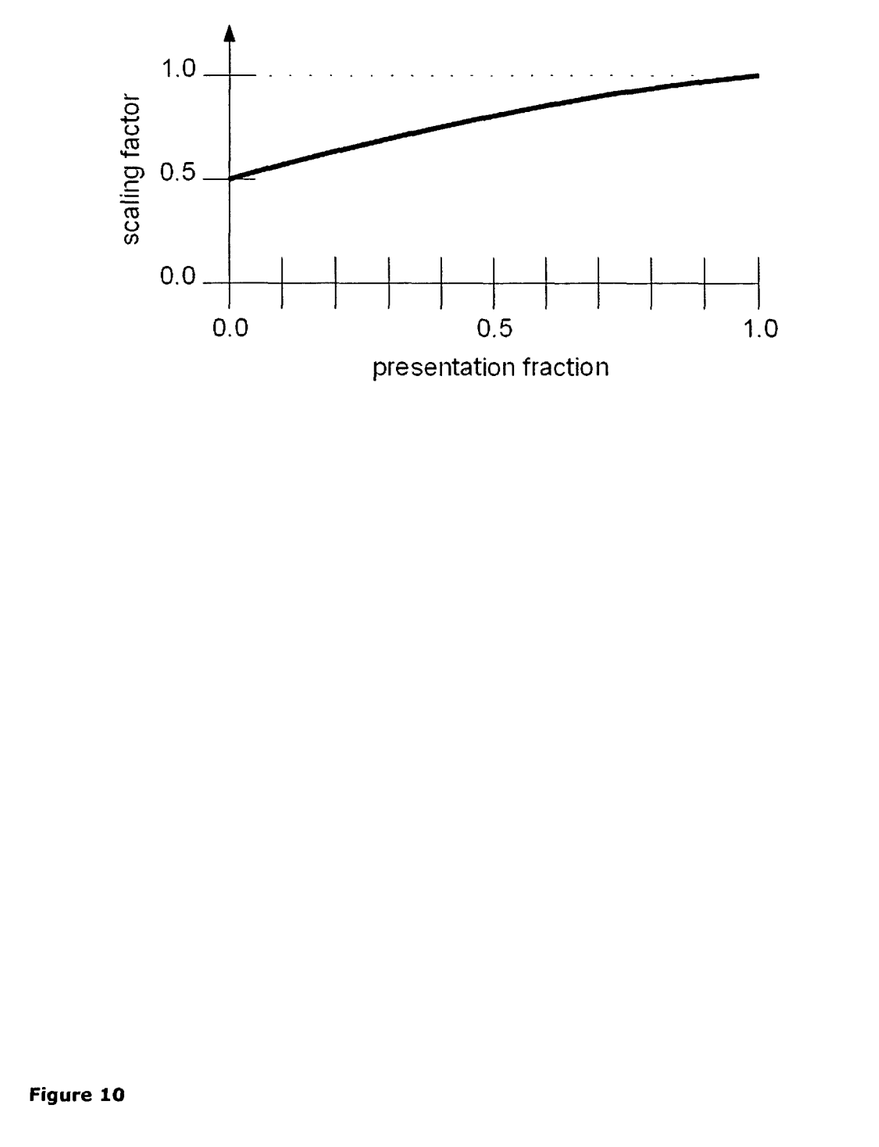
FIG. 10: This is the sixth graph.

In FIG. 10, the scaling factor changes from 0.5 to 1.0 as the Presentation Fraction changes from 0.0 to 1.0.

Figure 11:
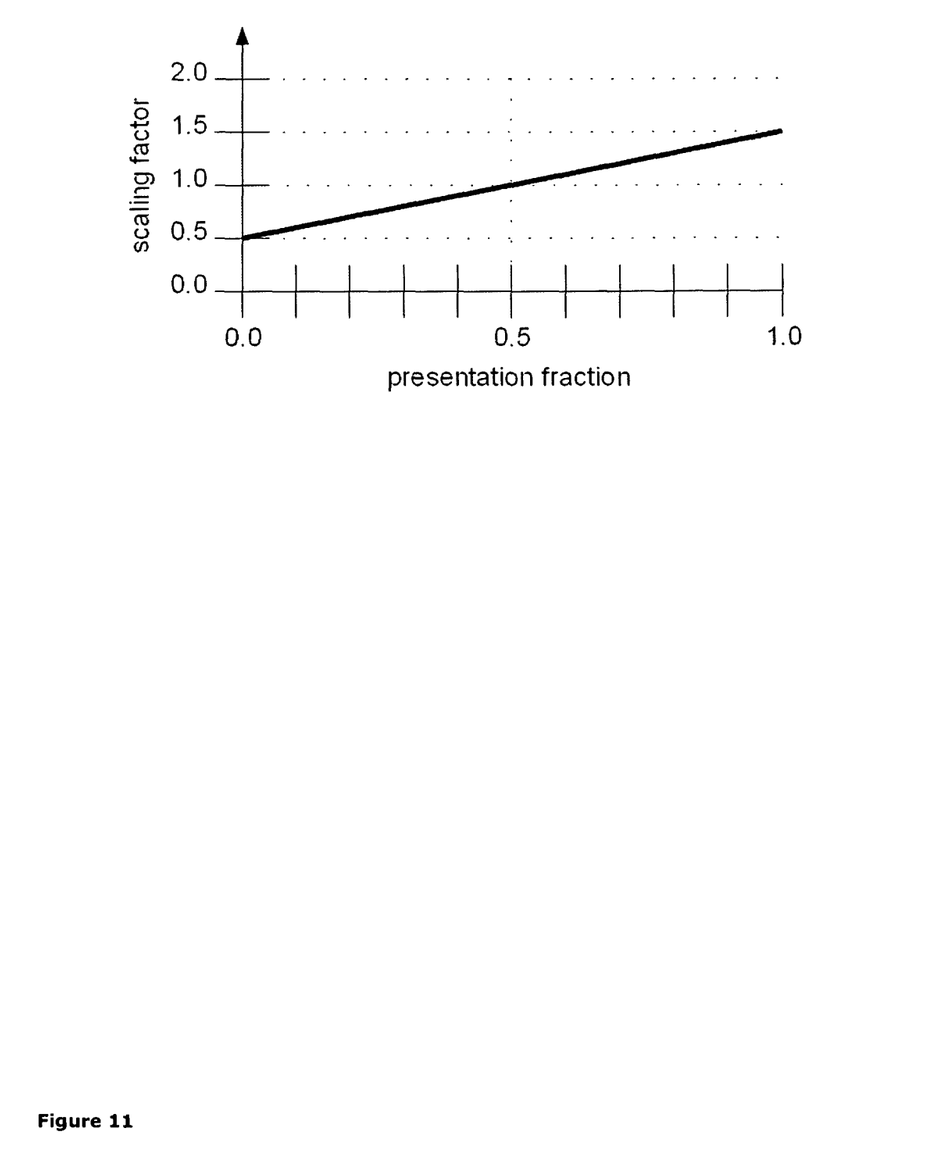
FIG. 11: This is the seventh graph.

In FIG. 11, the scaling factor changes linearly from 0.5 to 1.5, as the Presentation Fraction changes from 0.0 to 1.0.

In one implementation of this invention, the user can be given the option to modify the scaling factor by being presented with various options for modifying the probability of future random selection of a presentation from a presentation set, in which the user is presented with a 2-D Cartesian coordinate system, wherein the vertical axis represents the Scaling Factor and the horizontal axis represents the Skipped Presentation Duration or Presentation Fraction. The user can then adjust these factors by dragging the graph to create the example graphs disclosed here, or other graphs that are not shown here. Alternatively, the user can adjust the factors in a non-graphical manner by just changing the horizontal axis values by inputting the values desired. This is not implemented in the source code included herein, but this would be easily implemented by one skilled in the art, based on this explanation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method implemented within a computer system to modify the selection probability for a presentation that was randomly selected from a presentation set, comprising:
   a. loading presentation selection probabilities for a presentation set;
   b. normalizing the selection probabilities in the presentation set;
   c. selecting randomly a presentation from the presentation set based on the selection probabilities;
   d. presenting the randomly selected presentation; and
   e. if a user skips the randomly selected presentation, calculating a skipped presentation duration as the length of time between the time a presentation starts and the time the presentation is skipped, calculating an unskipped presentation duration as the duration of a presentation before another random selection of a presentation, then modifying the selection probability of the skipped presentation based on the presentation fraction, wherein the presentation fraction is calculated as the skipped presentation duration divided by the unskipped presentation duration.

2. The method of claim 1 further including: if the randomly selected presentation is completed in step d prior to a user skipping the randomly selected presentation in step e, then branching back to step c.

3. The method of claim 1 wherein normalizing the selection probabilities in the presentation set comprises dividing each selection probability in the presentation set by the sum of the selection probabilities in the presentation set.

4. The method of claim 1 further including:
   a. storing a presentation start time; and
   b. calculating a skipped presentation duration as the time the presentation is skipped by the user minus the presentation start time.

5. The method of claim 1 wherein modifying the selection probability of the skipped presentation based on the presentation fraction comprises decreasing the selection probability of the skipped presentation.

6. The method of claim 1 further including:
   a. if the presentation fraction is less than a preset value between zero and one, exclusive, then performing the following;
   b. calculating a scaling factor as the presentation fraction plus one minus the preset value; and
   c. setting the selection probability of the skipped presentation to the scaling factor times the current selection probability of the skipped presentation.

7. The method of claim 1 wherein normalizing the selection probabilities in the presentation set comprises dividing each selection probability in the presentation set by the sum of the selection probabilities in the presentation set; wherein modifying the selection probability of the skipped presentation comprises decreasing the selection probability of the skipped presentation and further including:
  a. if the randomly selected presentation is completed in step d of claim 1 prior to a user skipping the randomly selected presentation in step e of claim 1, then branching back to step c of claim 1;
  b. storing a presentation start time; and
  c. calculating a skipped presentation duration as the time the presentation is skipped by the user minus the presentation start time.

8. A computing apparatus, comprising: an output device; an input device; a processing apparatus operatively coupled to said output device and said input device, said processing apparatus comprising a processor and a memory; said processing apparatus being programmed to:
  a. load presentation selection probabilities for a presentation set;
  b. normalize the selection probabilities in the presentation set;
  c. select randomly a presentation from the presentation set based on the selection probabilities;
  d. present the randomly selected presentation;
  e. if a user skips the randomly selected presentation, calculating a skipped presentation duration as the length of time between the time a presentation starts and the time the presentation is skipped, calculating an unskipped presentation duration as the duration of a presentation before another random selection of a presentation, then modifying the selection probability of the skipped presentation based on the presentation fraction, wherein the presentation fraction is calculated as the skipped presentation duration divided by the unskipped presentation duration.

9. A computing apparatus as described in claim 8 additionally programmed to do the following: if the randomly selected presentation is completed in step d prior to a user skipping the randomly selected presentation in step e, then branch back to step c.

10. A computing apparatus as described in claim 8 wherein normalizing the selection probabilities in the presentation set comprises dividing each selection probability in the presentation set by the sum of the selection probabilities in the presentation set.

11. A computing apparatus as described in claim 8 additionally programmed to do the following:
  a. store a presentation start time; and
  b. calculate a skipped presentation duration as the time the presentation is skipped by the user minus the presentation start time.

12. A computing apparatus as described in claim 8 wherein modifying the selection probability of the skipped presentation based on the presentation fraction comprises decreasing the selection probability of the skipped presentation.

13. A computing apparatus as described in claim 8 additionally programmed to do the following:
  a. if the presentation fraction is less than a preset value between zero and one, exclusive, then performing the following;
  b. calculate a scaling factor as the presentation fraction plus one minus the preset value; and
  c. set the selection probability of the skipped presentation to the scaling factor times the current selection probability of the skipped presentation.

14. The computing apparatus of claim 8 wherein normalizing the selection probabilities in the presentation set comprises dividing each selection probability in the presentation set by the sum of the selection probabilities in the presentation set; wherein modifying the selection probability of the skipped presentation comprises decreasing the selection probability of the skipped presentation and said processing apparatus being additionally programmed to do the following:
  a. if the randomly selected presentation is completed in step d of claim 8 prior to a user skipping the randomly selected presentation in step e of claim 8, then branch back to step c of claim 8;
  b. store a presentation start time; and
  c. calculate a skipped presentation duration as the time the presentation is skipped by the user minus the presentation start time.

* * * * *